April 28, 1964 HANNS-DIETER PASCHKE ETAL 3,130,683
SEAL LUBRICATING MEANS
Filed April 26, 1962
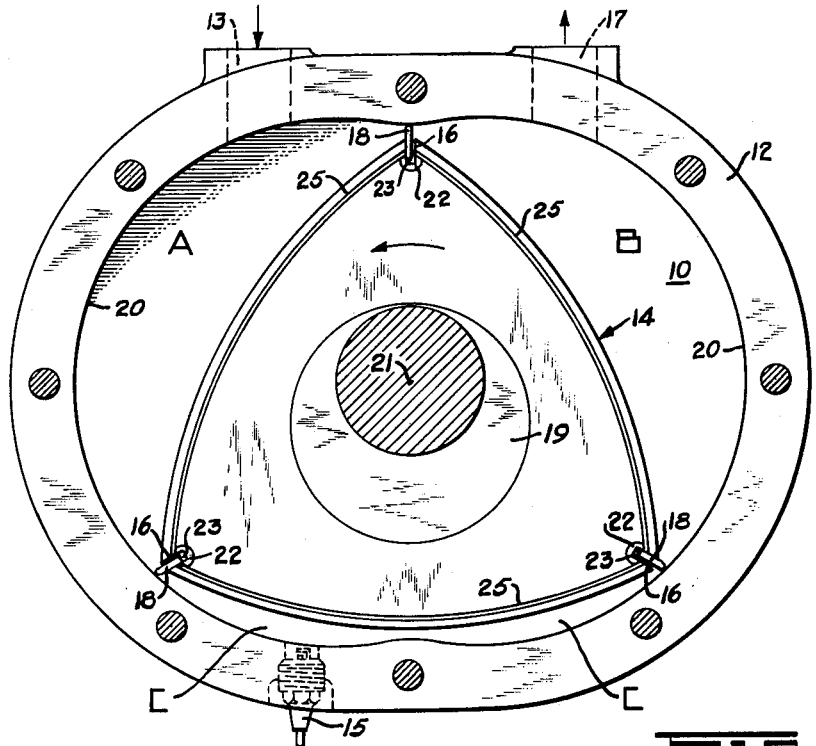
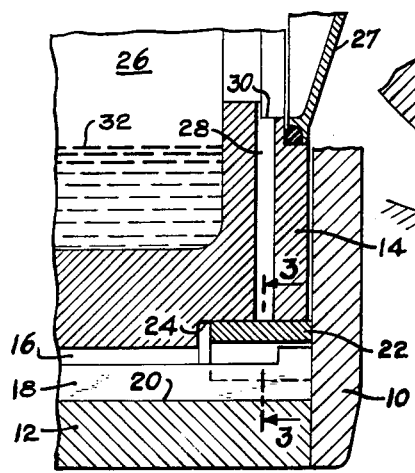
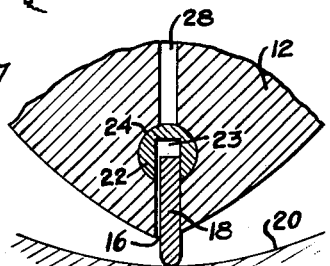
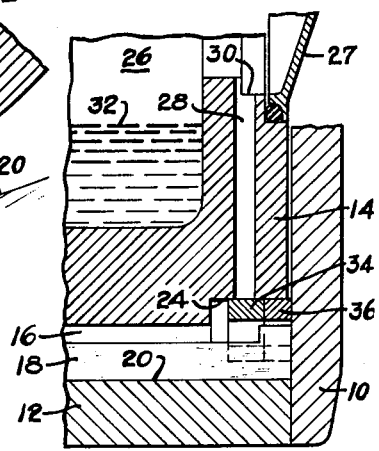
INVENTORS
HANNS-DIETER PASCHKE
WALTER FROEDE
BY
ATTORNEY

United States Patent Office 3,130,683
Patented Apr. 28, 1964

3,130,683
SEAL LUBRICATING MEANS
Hanns-Dieter Paschke and Walter Froede, Neckarsulm, Germany, assignors to NSU Motorenwerke Aktiengesellschaft, Neckarsulm, Germany, and Wankel G.m.b.H., Lindau (Bodensee), Germany
Filed Apr. 26, 1962, Ser. No. 190,293
Claims priority, application Germany May 5, 1961
5 Claims. (Cl. 103—130)

This invention relates to rotary mechanisms and in particular to a means for lubricating the rotor seals. Although the invention may be utilized in various types of rotary mechanisms, for example, combustion engines, fluid motors, compressors and the like, it is particularly suitable for use in rotary combustion engines and therefore has been described in relation to such engines. Such a rotary engine may be of the type disclosed in United States Patent Number 2,988,065, issued to Felix Wankel et al. on June 13, 1961.

In general engines of this type comprise a housing formed by two end walls interconnected with a peripheral wall to form a cavity therein which preferably is basically an epitrochoid. An inner body or rotor is mounted within the housing on an axis spaced from but parallel to the housing axis. The rotor is formed with a plurality of circumferentially spaced apex portions which during rotation continuously engage in inner surface of said peripheral wall. During relative rotation of the outer body and inner rotor working chambers of variable volume are formed which successively go through the stages of intake, compression, expansion and exhaust. For more specific details of the operation of an engine of this type, reference may be made to said above-mentioned patent.

It is generally the practice to provide sealing apparatus in the apex portions and side faces of the inner rotor in order that the working chambers are effectively sealed off from one another. By this means undesirable engine characteristics such as blow-by compression loss, etc. are prevented. However, the sealing apparatus, which is usually made up of seal strips, sometimes need lubrication to reduce friction and wear caused by the engagement of the seal strips with the inner surface of the housing. In some two-cycle engines the combustion chamber seal lubrication has been effected by mixing oil in the engine fuel. This, however, is not always desirable. Attempts have also been made to avoid the mixing process by using a metering pump which supplies small amounts of lubricating oil to the working chambers.

It is a purpose of this invention to provide means for lubricating the seals for a rotary mechanism without mixing oil with the fuel supplied to the engine and without the use of a supplementary lubricating oil metering pump. This purpose is carried out by utilizing the cooling medium which is pumped through a hollow space or cavity in the rotor. This medium generally has a lubricating characteristics and in engines wherein the rotor is mounted upon an eccentric the medium serves also to lubricate the rotor bearing. An arrangement for cooling and lubricating such a rotor is clearly disclosed in copending application Serial Number 165,799, now Patent No. 3,102,682, filed January 12, 1962. In order to supply lubricant to the seal strips, passages are formed in the rotor wall which communicate with the cooling and lubricating medium pumped to the cavity and with the grooves in which the seal strips are mounted. However, in order to prevent the operating medium, that is the gases formed as a result of combustion, from entering the lubricating medium supply passages, a check valve mechanism is provided which is hereinafter set forth in more detail below. Therefore, the channels are only open to supply lubricant to the seal strips when the pressure from the gases and other sources is less than the pressure exerted by the lubricating medium.

Accordingly, it is an object of this invention to provide a novel lubricating means for the sealing apparatus of a rotary mechanism.

It is further an object of this invention to provide an effective lubricating system for the sealing apparatus of a rotary combustion engine while substantially preventing leakage of gases through said sealing apparatus.

It is also an object of this invention to provide a means for directing a cooling medium having lubricating properties from medium supply means to the seal grooves and having means for controlling the flow of said medium to said seal grooves.

Other advantages and objects of the invention will become apparent when reading the following detailed description in connection with the drawing in which:

FIGURE 1 is an enlarged sectional view of the housing and inner rotor,

FIGURE 2 is an end view of the mechanism with one end wall removed,

FIGURE 3 is a sectional view taken along line 3—3 of FIGURE 1 and

FIGURE 4 is a view similar to that shown in FIGURE 1 but showing a modification in the sealing elements.

With reference to the drawing there is shown a portion of a rotary mechanism which has been substantially enlarged for purposes of more clearly illustrating the invention and does not purport to indicate the actual dimensions of the elements involved.

In FIGURES 1–3 there is shown a housing or outer body having a pair of end walls 10, only one of which is shown, interconnected with a peripheral wall 12 forming a cavity in which a rotor 14 is mounted for relative rotation with respect to said outer body. The rotor 14 has a plurality of circumferentially spaced apex portions having a groove 16 cut in each in which there is mounted a radially-mobile seal strip 18. Each such apex groove 16 and apex seal strip 18 extends from one end face to the other end face of the rotor. The rotor 14 is mounted on an eccentric 19 which is mounted on a shaft 21. The inner surface 20 of the peripheral wall preferably is basically an epitrochoid. During relative rotation of the outer body and rotor the apex seal strip 18 is maintained in continuous engagement with the inner surface 20 of the peripheral wall. The axial ends of the seal strip 18 are in engagement with an intermediate body or sealing member 22 which is axially movable so as to engage with the inner surface of side walls 10. The intermediate seal body 22 is mounted in an enlarged recess 24 formed in an end of the associated apex seal groove 16 and is slotted as indicated at 23 to receive the associated apex seal 18. End face seals 25 in the end face of the rotor are also provided for sealing against the inner surface of the housing side walls and bear at their ends against the intermediate seal body 22 to provide a continuous seal. The seal strip 18 is generally urged against the inner surface 20 and the intermediate body 22 is urged against the inner face of wall 10 by gas pressure from one of the working chambers A, B or C acting through the associated groove 16 and recess 24. Elastic means (not shown) such as springs may also be provided behind the seal members to further insure engagement of the seal members with their respective engagement surfaces.

As shown in FIGURE 2, an intake port 13 is provided for admitting a fuel-air mixture to working chamber A, a spark plug 15 is provided to ignite said mixture in chamber C and an exhaust port 17 is provided in chamber B for expelling the burnt gases.

The rotor 14 is provided with a cavity 26 through which flows a cooling medium having lubricating characteristics. Directing the medium or liquid into the cavity 26 may be accomplished by any suitable means and forms no part of the present invention. For example one such means may be of the type illustrated in co-pending application Serial Number 165,799, now Patent No. 3,102,-682, filed January 12, 1962, and shown clearly in FIGURES 1, 3 and 4 of said application. Briefly, as shown in said co-pending application, the cooling lubricant is supplied through an end wall of the outer body to the space between said end wall and the adjacent side of the shaft eccentric of the rotor and then through suitable passages in the rotor into and out of the rotor for cooling the rotor and for lubricating the rotor bearing. A suitable seal 27 is provided between each end face of the rotor and the adjacent end wall to prevent flow of said lubricant outwardly therebetween. In accordance with the present invention passages are also provided in the rotor for directing liquid from said space to the rotor apex grooves. A passage 28 is bored in a side wall of the rotor 14 and communicates at its inner end with an opening 30 which in turn communicates with the space from which said liquid is supplied into the cavity 26. At its outer end the passage 28 communicates with a recessed portion 24 at a rotor apex portion. It can be readily seen that when the lubricating liquid is directed into cavity 26 some of it will be directed into passage 28 and flow in the direction of recess portion 24 and groove 16. When the gas pressure in the groove 16 is greater than the pressure of the lubricating liquid in the outer end of the passage 28, the intermediate body 22 will be pressed against the inner wall of the recessed portion 24 wherein the outlet portion of passage 28 terminates thereby closing said passage to prevent any lubricant from flowing therefrom. When the pressure in groove 16 is reduced to a point where the pressure of the liquid in passage 28 becomes greater than the pressure in said groove, the intermediate body 22 is moved slightly away from the outlet opening of the passage and the lubricant will flow out from the passage. As the intermediate seal body 22 shifts axially slightly during engine operation, the lubricating liquid becomes distributed over the outer surfaces of said seal body and at one end flows into the inner end of recessed portion 24 and from there into the associated apex groove 16 where it then flows over the side faces of the apex seal strip 18 to the outer edge of said strip and the inner surface of the peripheral wall 20. The lubricating liquid also flows axially outward between the outer surface of intermediate seal body 22 and the inner wall of recessed portion 24 and then by centrifugal force is directed outward along the inner surface of wall 10 to lubricate the engaging surfaces of said wall surface, the intermediate seal body 22 and seal strip 18. Thus it can be seen that intermediate seal body 22 acts as a kind of a check valve to periodically allow lubricating liquid to flow from the passage 28 and at other times blocking the passage outlet so that gases from combustion will not enter the passage and result in compression loss or in polluting of the lubricating medium, while at the same time cooperating with seal strip 18 and end face seals 23 to provide effective sealing of the working chambers.

When the engine is stopped and is in a rest position, the lubricating liquid situated in the rotor cavity 26 collects in the lower part of the cavity and seeks a level illustrated by line 32. Suitable means may be provided within the cavity to ensure the liquid level in the rotor cavity is kept at a minimum as for example, an outlet port positioned at the desired level. Such an outlet may be of the type illustrated in the above mentioned co-pending application Serial Number 165,799, now Patent No. 3,102,682, but forms no part of the present invention. It may be assumed however, that, in any case, a certain amount of fluid will remain in the rotor cavity when the engine is at rest. For the purpose of avoiding the draining of the rotor cavity 26 into the working chambers through passage 28 when the engine is at rest, the upper part of the passage or the portion where the passage 28 communicates with the main fluid supply is situated above the fluid level 32. It should also be understood that in actual practice the passage 28 is relatively small in diameter and has been greatly enlarged for purposes of illustration.

The embodiment of FIGURE 4 differs from FIGURE 1 only in the construction of the intermediate seal bodies. In FIGURE 4 the intermediate body is composed of two slotted annuli of the type disclosed in FIGURES 10 and 11 of copending application Serial Number 134,050, filed August 22, 1961. The slotted annuli indicated at 34 and 36 are positioned in recess 24, the inner annulus 34 being positioned at the terminating point of passage 28 and the outer annulus 36 being in cooperative engagement with end face seals 23. When under gas pressure, the annulus 34 which is resilient spreads out and bears against the inner wall of recess 24, thereby closing the opening of channel 28 and preventing fluid flow therethrough. When the pressure is reduced sufficiently the annulus 34 is no longer spread out and the pressure of the lubricant enables it to flow out into the recess 24 and provide the above described lubrication as in the embodiment of FIGURE 1. The end face seals 23, which engage only the outer annuli 36 of each intermediate seal body may thereby prevent said annuli 36 from similarly enlarging in response to the internal gas pressure.

It should be self-evident that, in order to provide proper lubrication for each of the apex seal elements of the engine, a lubricating liquid supply passage is provided to an intermediate seal body at each apex portion and preferably at each end of each apex portion. Also various shapes of passages could be used and the invention is not to be limited to a radial passage as illustrated nor should the invention be limited to the specific valve means as provided by the intermediate seal bodies shown herein. Also, other means could be used responsive to the gas pressures in the apex seal slots for regulating the lubricating liquid supply passages 28 and for closing passages 28 when the gas pressure in the associated slot 16 exceeds that of the lubricating liquid in said passage.

We claim as our invention:

1. In a rotary mechanism comprising an outer body having a pair of end walls and a peripheral wall connected therebetween to form a cavity; a rotor mounted for relative rotation within said cavity, said rotor having a plurality of circumferentially-spaced grooves and having seal elements received within said grooves and projecting outwardly therefrom for sealing cooperation with the peripheral wall of said cavity to form a plurality of of working chambers which vary in volume during relative rotation of said rotor, said grooves being in communication with said chambers, end face seals on said rotor end faces for sealing engagement with said end walls, and said rotor having passages for supplying a lubricating medium to said grooves; and intermediate seal means positioned in each said groove adjacent the outlet end of each supply passage to said grooves and having sealing cooperation with said seal elements and said end face seals and said intermediate seal means being responsive to the fluid pressure within each groove for closing the lubricant supply passage to said groove when said fluid pressure is of a magnitude sufficient to otherwise cause said fluid to flow into said passage.

2. In a rotary mechanism as recited in claim 1 wherein said intermediate seal means comprises a pair of slotted annuli one of which is normally positioned at said passage outlet and another of said annuli being in cooperative engagement with said end face seal means.

3. In a rotary mechanism as recited in claim 1 wherein the profile of said peripheral wall is basically a multi-lobed epitrochoid and said rotor is mounted on an axis which is eccentric to the axis of said epitrochoid, and wherein said intermediate seal means has a slot to receive the adjacent side of its associated seal element for sealing cooperation therewith.

4. In a rotary mechanism as recited in claim 1 wherein said passage is formed in a wall of said rotor, the inner end of said passage being positioned above the lubricating medium level in said rotor when said mechanism is at rest.

5. In a rotary mechanism as recited in claim 1 wherein said intermediate seal means engage said end walls and are axially movable in said grooves such that said lubricant supplied to said grooves will be distributed on said end walls.

References Cited in the file of this patent

UNITED STATES PATENTS

| 2,801,791 | Walter | Aug. 6, 1957 |
| 3,033,180 | Bentele | May 8, 1962 |

FOREIGN PATENTS

| 690,003 | Great Britain | Apr. 8, 1953 |